United States Patent [19]
Kitaguchi et al.

[11] Patent Number: 5,321,269
[45] Date of Patent: Jun. 14, 1994

[54] NEUTRON INDIVIDUAL DOSE METER, NEUTRON DOSE RATE METER, NEUTRON DETECTOR AND ITS METHOD OF MANUFACTURE

[75] Inventors: Hiroshi Kitaguchi, Naka; Shigeru Izumi, Tokyo; Akihisa Kaihara, Hitach, all of Japan

[73] Assignee: Hitachi, Ltd., Tokyo, Japan

[21] Appl. No.: 778,876

[22] PCT Filed: Apr. 26, 1991

[86] PCT No.: PCT/JP91/00574

§ 371 Date: Dec. 27, 1991

§ 102(e) Date: Dec. 27, 1991

[87] PCT Pub. No.: WO91/17462

PCT Pub. Date: Nov. 4, 1991

[30] Foreign Application Priority Data

Apr. 24, 1990 [JP] Japan .................. 2-110092

[51] Int. Cl.5 .................. G01T 3/08; H01L 31/115; H01L 31/00
[52] U.S. Cl. .................. 250/370.05; 250/252.1; 250/390.03
[58] Field of Search .................. 250/370.05, 390.03, 250/252.1 R

[56] References Cited

U.S. PATENT DOCUMENTS

| | | | |
|---|---|---|---|
| 4,074,136 | 2/1978 | Heinzelmann et al. | 250/392 |
| 4,489,315 | 12/1984 | Falk et al. | 340/600 |

FOREIGN PATENT DOCUMENTS

| | | | |
|---|---|---|---|
| 1386485 | 12/1964 | France | 250/370.05 |
| 55-95886 | 7/1980 | Japan | 250/370.05 |
| 58-167988 | 10/1983 | Japan . | |
| 64-39778 | 2/1989 | Japan . | |
| 01-164071 | 6/1989 | Japan . | |
| 01-253971 | 10/1989 | Japan . | |

OTHER PUBLICATIONS

Dale E. Hankins, "Phantoms for Calibrating Albedo Neutron Dosimeters." *Health Physics*, vol. 39, No. 3 (Sep. 1980) pp. 580-584, Pergamon Press Ltd.

*Primary Examiner*—Constantine Hannaher
*Attorney, Agent, or Firm*—Antonelli, Terry, Stout & Kraus

[57] ABSTRACT

A neutron individual dose meter and a neutron dose rate meter, both capable of implementing the effective dose equivalent response. The neutron individual dose meter is capable of being accomplished by providing a composite layer made up of a converter such as boron, and a proton radiator, on the surface of a semiconductor neutron detection element. The neutron dose rate meter is capable of being accomplished through such a structure as to surround a neutron detector with a neutron moderator and a thermal neutron absorber which has openings. Thus, a neutron individual dose meter and a neutron dose rate meter, both capable of implementing the effective dose equivalent response and measurement at lower operating voltage have been provided. Further, these meters are capable of being implemented by utilizing a single semiconductor detection element, respectively.

29 Claims, 11 Drawing Sheets

A-A CROSS-SECTION

NEUTRON INDIVIDUAL DOSE METER, NEUTRON DOSE RATE METER, NEUTRON DETECTOR AND ITS METHOD OF MANUFACTURE

FIELD OF THE TECHNOLOGY

The present invention relates to a portable neutron dose meter for use by individuals who are engaged in radiation handling in radiation handling facilities such as nuclear power plants, reprocessing facilities and the like, a neutron exposure dose rate meter for monitoring neutrons within the compounds of neutron handling facilities, and a neutron detector which serves as their detection element, and more specifically it relates to such that employs a semiconductor detector as its neutron detection element.

BACKGROUND TECHNOLOGY

As prior art neutron individual dose meters using semiconductor detection elements, there are such that have been described in Radiation Protection Dosimetry, Vol. 27, No. 3, pp145–156 (1989) (hereinafter referred to as the prior art 1) and in U.S. Pat. No. 322787 as the prior art 2). Because the (hereinafter referred to as semiconductor detection elements cannot detect neutrons directly, they manage to detect indirectly the neutrons by means of detecting charged particles which are generated by the interaction of the neutrons with other substances. For this purpose, the structure of the neutron detector in the prior art referred to in the former has a boron layer on the surface of the semiconductor detection element for detecting low energy thermal neutrons, and a polyethylene layer formed on the boron layer for detecting high energy fast neutrons. Further, in front of them, neutron moderator material is disposed to moderate neutron energy. The neutron detector in the prior art referred to in the latter case has a boron layer formed on the surface of a semiconductor detection element likewise the former example, the periphery of which layer is further surrounded by neutron moderator material in order to detect fast neutrons.

On the other hand, many of the prior art neutron exposure dose rate meters for monitoring neutrons in radiation handling facilities employ $BF_3$ counters or $^3He$ counters as described in the Japanese Patent Publication 63-235646 (1988) (hereinafter referred to as the prior art 3). It is disclosed, further, in the same publication that, in order to cut thermal neutrons and detect only fast neutrons, said counter is surrounded by neutron moderator, the surface of which is further surrounded by thermal neutron absorber, still further the surface of which is covered by neutron moderator, respectively.

Each country concerned is required to provide for various radiation detectors which satisfy energy response characteristics so that the effective dose equivalent evaluation conforming to the recommendation of the International Committee on Radiological Protection (ICRP) may be performed. Also in Japan, in accordance with the ICRP recommendation, the domestic radiation hazard prevention laws and regulations have been revised in April, 1989. Generally, radiation damages (dose quantities) differ depending on materials, even when they are exposed to radiation of the same energy. The so-called effective dose equivalent refers to a dose value for evaluation which precisely reflects an exposure quantity to neutrons of a human body. In order to implement this effective dose equivalent, it is necessary to survey and evaluate respective quantities of dose of each energy in a human body over a wider spectrum range of energy existing in radiation handling facilities. The range of energy includes a region for thermal neutrons having energy in the thermal neutron region below 0.5 eV, to fast neutrons ranging above 0.5 eV up to 10 MeV. Here, a sensitivity curve with respect to each specific energy is called a response. Since the difference in the effective dose equivalent responses in terms of sensitivities between the thermal neutron region and the MeV region is as large as more than 50 times, it is extremely difficult to implement this required response. The required response will be called as a dose equivalent response hereinunder. In order to satisfy the dose equivalent response, it is important (1) to make the shapes of sensitivity curves to coincide with each other or minimize the difference in the sensitivities, and (2) to increase sensitivity to each energy.

First, the above case (1) will be considered from a viewpoint of implementing a neutron individual dose meter.

In the prior art 1, in order to render the sensitivity curves to coincide with each other, in addition to the above-mentioned neutron detector, another neutron detector which has only a polyethylene layer on a semiconductor detector is provided therewith, then the responses of the two neutron detectors are added. However, as shown in FIG. 11 in page 155, the response performance has not been satisfied in an energy range from 10 K eV up to 1 MeV. In addition, there is a problem that the device tends to become large-sized because it utilizes two neutron detectors, and its processing circuitry is more complicated.

Next, we will consider the case (2). The prior arts 1 and 2 have a structure such that a layer of boron $10(^{10}B)$ is formed on the surface of a semiconductor detection element, and charged particles ($\alpha$ rays) generated in the layer when neutrons enter therein are detected by the semiconductor detection element. Such materials which generate charged particles when thermal neutrons enter will be called a converter hereinafter. In the neutron detector according to the prior art 1, the thickness of a boron 10 layer is formed to 1 micron m thickness by plasma doping techniques. Boron, however, has drawbacks that its melting point is as high as 2300 degree C., and its processibility is extremely poor. Further, the thickness of a boron film cannot be increased more than 1 micron m in order to prevent peel-off of the film due to temperature changes, because thermal expansion coefficients between boron and silicon which constitutes a semiconductor detection element differ as large as 3.5 times. The number of $\alpha$ rays generated in boron being increased in proportion to its film thickness, there has been a problem in implementing a neutron detector which has a sufficient detection sensitivity. While in the prior art 1 there has been described diffusion injection means for injecting boron, it has not been successful in increasing boron concentrations in diffused layers, thus failing to attain a neutron detector having a sufficient detection sensitivity. Boron enters into a nuclear reaction with a high probability when it encounters thermal neutrons, generating a lot of $\alpha$ rays, but it does not respond so vigorously to fast neutrons (high-energy neutrons over several ev). Therefore, it has a structure such that a polyethylene layer is provided, as has been described in the prior art 1, so as to enable detection of charged particles (protons) to be generated when fast neutrons enter therein by the semiconductor detection element. Such substance which generates protons when encountered with incident fast neutrons is called a proton radiator. It, however, has had a problem that it could not improve sensitivity to neutrons in an energy range from 10 KeV to 1 MeV.

Now, let's consider the neutron dose rate meter. According to the prior art 3, the dose equivalent response has not been satisfied. Further, because of a higher operating voltage at the time of neutron detection, which results in a more complicated measuring circuits, the prior art 3 has had a problem that it somewhat lacked reliability.

Further, the prior arts 1 and 2 have not been contemplated to be applied to neutron dose rate meters, hence there has been devoid of any such consideration.

A first object of the present invention is to provide for a portable neutron individual dose meter which attains the dose equivalent response.

A second object of the present invention is to provide for a portable neutron individual dose meter which attains the dose equivalent response by using a single semiconductor detection element.

A third object of the present invention is to provide for a portable neutron individual dose meter which has a high sensitivity to thermal neutrons.

A fourth object of the present invention is to provide for a portable neutron individual dose meter which has a high sensitivity to fast neutrons.

A fifth object of the present invention is to provide for a neutron exposure dose rate meter which implements the dose equivalent response.

DISCLOSURE OF THE INVENTION

In order to accomplish the first and second objects of the present invention, there have been provided: a neutron detector having a layer comprising a first material which emits charged particles through a nuclear reaction with incident thermal neutrons and a second material which emits charged particles through interactions with incident fast neutrons, the same layer being bonded on the surface of a semiconductor detection element; a processing circuit for processing signals obtained from the neutron detector; and a power source for supplying power to the neutron detector and the processing circuit.

In order to accomplish the third object of the present invention, there have been provided: a neutron detector having a grain-formed material which emits charged particles through a nuclear reaction with incident thermal neutrons and another material which does not emit charged particles through interactions with incident fast neutrons, each being formed on the surface of a semiconductor detection element; a processing circuit for processing signals obtained from the neutron detector; and a power source for supplying power to the neutron detector and the processing circuit.

In order to accomplish the third or fourth object of the present invention, there are provided: a single semiconductor wafer; a pair of electrodes formed on the obverse and reverse surfaces of the semiconductor wafer; a power source for supplying power to the electrodes; a neutron detector having a semiconductor detection element wherein the electrode through which the charged particles enter is formed so as to cover a portion of a depletion region thereof; a processing circuit for processing signals obtained from the neutron detector; and a power source for supplying power to the neutron detector and the processing circuit.

In order to accomplish the fifth object of the present invention, there are provided: a neutron detector having a layer comprising a first material which emits charged particles through a nuclear reaction with incident thermal neutrons and a second material which emits charged particles through interactions with incident fast neutrons, the same layer being formed on the surface of a semiconductor detection element; at least one of a neutron moderator and a thermal neutron absorber which are installed in the direction of the incident neutrons with respect to, or in such a manner as to surround, the neutron detector; a processing circuit for processing signals obtained from the neutron detector; and a power source for supplying power to the neutron detector and the processing circuit.

In order to accomplish the fifth object of the present invention, there have been provided: a neutron detector having a layer comprising a first material which emits charged particles through a nuclear reaction with incident thermal neutrons and a second materials which emits charged particles through interactions with incident fast neutrons, the layer being formed on the surface of a semiconductor detection element; a phantom which simulates a human body on which to attach the neutron detector; a processing circuit for processing signals obtained from the neutron detector; and a power source for supplying power to the neutron detector and the processing circuit.

In order to accomplish the fifth object of the present invention, there are provided: a neutron detector having a material bonded on its surface, which emits charged particles through interactions with incident neutrons; a neutron moderator and a thermal neutron absorber disposed such as to surround the neutron detector; a processing circuit for processing signals obtained from the neutron detector; and a power source for supplying power to the neutron detector and the processing circuit.

The dose equivalent response Sa(E) is capable of being expressed by equation 1 as follows.

$$Sa(E) = Da(E) \cdot fa(E) \cdot Ia(E) \tag{1}$$

where, Da(E) (see FIG. 2 (b)) represents a neutron sensitivity response, indicating a sensitivity response to neutron energy E by the neutron detector itself, fa(e) (see FIG. 2 (d)) represents a phantom sensitivity response, indicating a response to the neutron detector of incident neutrons entering a human body or human body simulator, and Ia(E) (see FIG. 2 (c)) indicates an incident neutron spectrum. Thereby, the effective dose equivalent response S(E) in accordance with the ICRP recommendation is a preferred response which corresponds to a case when an incident neutron spectrum Ia(E) is a unit spectrum I(E). Thereby, it is expressed by equation 2 as follows.

$$S(E) = D(E) \cdot f(E) \tag{2}$$

Thereby, with respect to a neutron dosimeter to be used carried by an individual, it is necessary for the neutron sensitivity response Da (E) to indicate a preferred response D(E), because the human body itself indicates a preferred phantom response D(E) of necessity. On the other hand, with respect to the neutron dose rate meter, it is necessary for the effective dose equivalent response S(E) to be satisfied at least by the product of responses of the neutron detector and a human body simulating phantom. Namely, if the neutron detector satisfies the effective dose equivalent response D(E) by itself, the phantom may be constituted simply to simulate a human body. On the other hand, if the neutron detector cannot satisfy the effective dose equivalent response by itself, the phantom may be constituted, though a total sensitivity may drop, to complement the insufficiency so as to satisfy the effective dose equivalent response S(E) as a whole. Means and its functions to solve the problems based on the above concepts will be described in the following.

First, the individual neutron exposure dosimeter will be explained. With respect to the individual neutron exposure dosimeter, it is desired for the response of the neutron detector to be such as shown in FIG. 2(b). The neutron sensitivity response D(E) according to the present invention involves roughly two curves, this is based on the knowledge that; a first curve, $D_1(E)$ depends on a converter which emits low energy neutrons consisting mainly of thermal neutrons and $\alpha$ rays; and a second curve D(2)(E) depends on a proton radiator which emits protons through interactions with high energy neutrons consisting mainly of fast neutrons. Thereby, it is not necessary to provide the neutron moderator disposed in front of the neutron detector as described in the prior art 1. If, however, the converter and the proton radiator are provided in separate layers, for example, in the sequence of a converter directly on a semiconductor detection element, then a proton radiator thereupon, protons generated in the proton radiator cannot reach the semiconductor detection element being prevented by the converter. Hence, according to the present invention, the converter and proton radiator are provided in the same composite layer each coexisting therein, bonded to the surface of a semiconductor detection element. As a result, the neutron sensitivity response D(E) is capable of being satisfied by adjusting respective amounts of the converter and proton radiator, and a total thickness of the layer. The response of a semiconductor neutron detection element having a converter and a proton radiator varies greatly according to its structure how the converter and proton radiator are built. Namely, when a large quantity of converter is provided on the surface of a detection element, an increased sensitivity to thermal neutron components will be attained, while, on the contrary, an increased sensitivity to fast neutron components will be attained if a large quantity of proton radiator is provided therein. Thereby, by adding a power source and a processing circuit to such neutron detector, a neutron individual exposure dosimeter is capable of being implemented. Since it is only required for a preferred converter to react with thermal neutrons to generate charged particles, boron, lithium or the like may be utilized. Further, as a preferred proton radiator, there are hydride compounds such as paraffin, polyethylene, and other organic compounds or resins composed of them. Since boron and hydride compound are typically employed for the converter and the proton radiator, respectively, related description hereinunder will be made with these typical two materials as examples.

Next, means for increasing sensitivity to thermal neutrons will be explained. An increased sensitivity to thermal neutrons is capable of being attained by increasing the thickness of a converter, i.e., the thickness of a boron layer. Boron, however, has such drawbacks that it has a melting point as high as approximately 2300° C., an extremely poor processibility, and that the difference in thermal expansion coefficients between a boron film and silicon constituting a semiconductor detection element is as large as 3.5 times, thus failing to provide a boron film having a thickness more than 1 $\mu$m. In an embodiment according to the present invention, an effective thickness of a film is enabled to be increased by providing boron in a grain form or powder mixed with other materials. These other materials are preferably such that which has a thermal expansion coefficient not too much different from that of silicon, or that which has elasticity so as to absorb the thermal expansion of boron. Further, in case boron is prepared in grain, and a boron layer is formed by calcination of grain boron, its processibility will be much simplified. Further, as the boron layer is composed of grain boron, a peel-off problem of the layer due to the difference in the thermal expansion coefficients with silicon caused by temperature changes is solved. Thus, a sufficiently thicker boron layer than by the prior art is capable of being formed, providing for an increased sensitivity to thermal neutrons. When the other material of the above is a hydride compound to be utilized as the proton radiator, by arbitrarily setting its grain size (average grain diameter) of boron, it is possible to control the quantity of the hydride compound to be bonded to the surface of silicon. The sensitivity to fast neutrons being changed accordingly, the response characteristics of the detector are capable of being adjusted with respect to a total neutron energy, which is also preferable in implementing the effective dose equivalent response. Further, they being elastic, the hydride compounds are preferable in view of mitigating the peel-off problem. Further, in such a structure where the interstices of the above-mentioned grain converters are infiltrated or plugged with proton radiators, a grain size of the grain converters is likely to control a total response. For example, when the grain size becomes smaller, sensitivity to thermal neutron components is increased. In case boron($^{10}$B) is used for converters, $\alpha$ rays of 1.47 MeV will be produced through a nuclear reaction with thermal neutrons. Likewise, proton radiators will produce proton beams through interactions with fast neutrons. When these charged particles ($\alpha$ rays, proton beams) enter the detection element, pairs of charges of electrons and holes are generated therein through the charged particles' ionization actions. Since a range for $\alpha$ rays is less than 10 $\mu$m, a thickness more than that for the converters will make no difference in sensitivity responses. On the other hand, a range for proton rays emitted from the proton radiators is approximately 1 mm at an energy level of 10 MeV. Thereby it is typical with the detection elements having such structures as above that a thin layer of converters of several 10 micron m thickness is formed on the surface of the element, and proton radiators are infiltrated into interstices between converter grains, and proton radiators are further laminated thereupon in a thickness of 1–2 mm.

Because neutron dosimeters for personal use have to be portable, such a structure surrounded in a neutron absorber of a large dimension as in the neutron dose rate meter will not be advantageous in practical applications. When a personal dosimeter is used fixed to the chest of a human body, the human body itself serves as a neutron moderator. That is, fast neutrons are scattered and moderated in the human body, and the scattered components which are typically caleed albedo neutrons are effected to enter the dosimeter. Through adjustment of the grain size of boron and the thickness of proton radiators under the above conditions, a neutron dosimeter for personal use having the dose equivalent response is capable of being implemented.

Next, preferred means for increasing sensitivity at least to one of the thermal neutrons and fast neutrons will be described in the following. According to the prior arts, charged particles generated in the converters and proton radiators are blocked to enter a semiconductor detection element by its electrode portion and oxide film on the surface, as a result dropping its sensitivity. Thereby, in the prior art 2, electrodes are disposed collectively on the reverse surface of the converters and proton radiators. This type of devices, however, are not easy to manufacture. According to the present invention, an electrode disposed at the side of an incident window for charged particles is formed such as to cover only a portion of a depletion region therein. By such arrangement, an area of the electrode has been reduced, thereby blockage of incident charged particles by the electrode has been minimized. As a result, the number of charged particles to enter the semiconductor detection element has increased, thereby substantially improving detection sensitivity.

In the last, a preferred neutron exposure dose rate meter will be described below. As hereinbefore referred to, with respect to its construction, if a neutron detector itself is able to satisfy the effective dose equivalent response $D(E)$, it is necessary simply to construct a human body simulating phantom. If, on the contrary, the neutron detector itself is not able to satisfy the effective dose equivalent response $D(E)$, though a total sensitivity may drop, a phantom may be constituted such as to complement the insufficiency to satisfy the effective dose equivalent response $S(E)$ as a whole.

From the view point of the former, it is possible to provide for a neutron dose rate meter which satisfies the effective dose equivalent response $S(E)$, simply by attaching a neutron exposure dosimeter for personal use on the phantom which simulates a human body. As such a phantom, there is water, acrylic, or the like. Further, according to the present invention, neutron moderators or thermal neutron absorbers are substituted for the phantom. For instance, the semiconductor detection element may be surrounded by neutron moderators or thermal neutron absorbers. Then, by increasing the thickness of the neutron moderator, it is possible to adjust a rate of sensitivity, i.e., decreasing the sensitivity to thermal neutrons and increasing that to fast neutrons. Further, the thickness of thermal neutron absorbers or the width of openings are adjusted. A thermal neutron absorber with openings is fully transparent to fast neutrons permitting then to transmit therethrough. Sensitivity to thermal neutrons is capable of being adjusted by controlling an opening ratio. Through such arrangement, sensitivity to each energy source is capable of being adjusted, hence providing for a phantom which simulates human body.

From a view point of the latter, any neutron detectors consisting of semiconductor detection elements without utilizing silicon may be also employed.

PREFERRED EMBODIMENTS FOR IMPLEMENTING THE INVENTION

Figure 1:
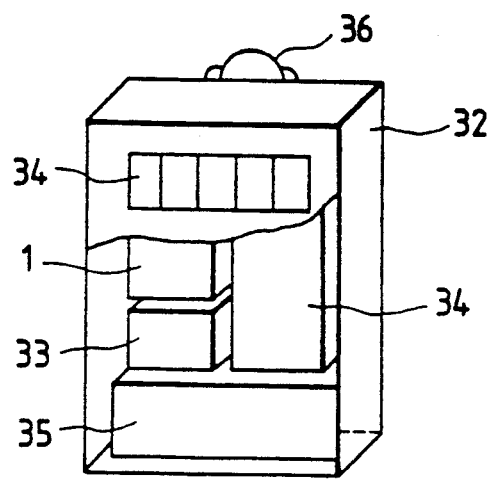
FIG. 1 shows a neutron individual exposure dosimeter according to a first embodiment of the present invention.
Figure 3:
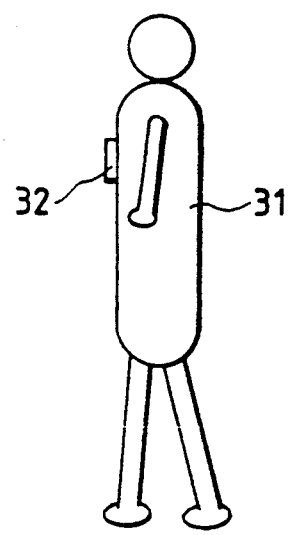
FIG. 3 illustrates how an individual neutron dosimeter according to the present invention is attached to the body.
Figure 2:
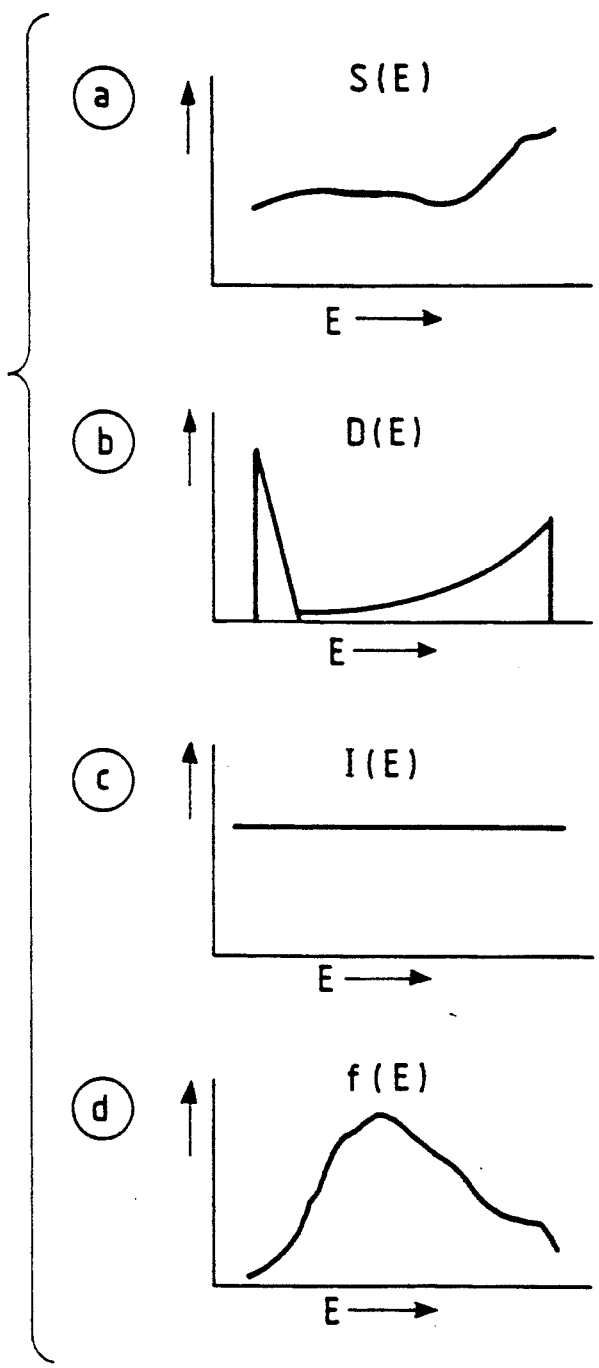
FIG. 2 shows an effective dose equivalent response, the response of a neutron detector, and the response of a phantom, relative to incident energy spectra.

Referring to the embodiments and drawings attached, detailed descriptions of the present invention will be made in the following. FIG. 1 shows a personal semiconductor neutron dosimeter of a preferred embodiment of the present invention. A semiconductor neutron detection element 1; a radiation measurement circuit (hybrid circuits) 33 including a preamplifier, a discriminator, a reverse bias application circuit and the like; an arithmetic display unit 34; and a power source 35 are contained in a portable carrying case 32. This portable dosimeter is attached to the chest portion of a worker with a clip 36. FIG. 3 illustrates how this semiconductor neutron dosimeter 32 is attached to a human body 31.

Figure 4:
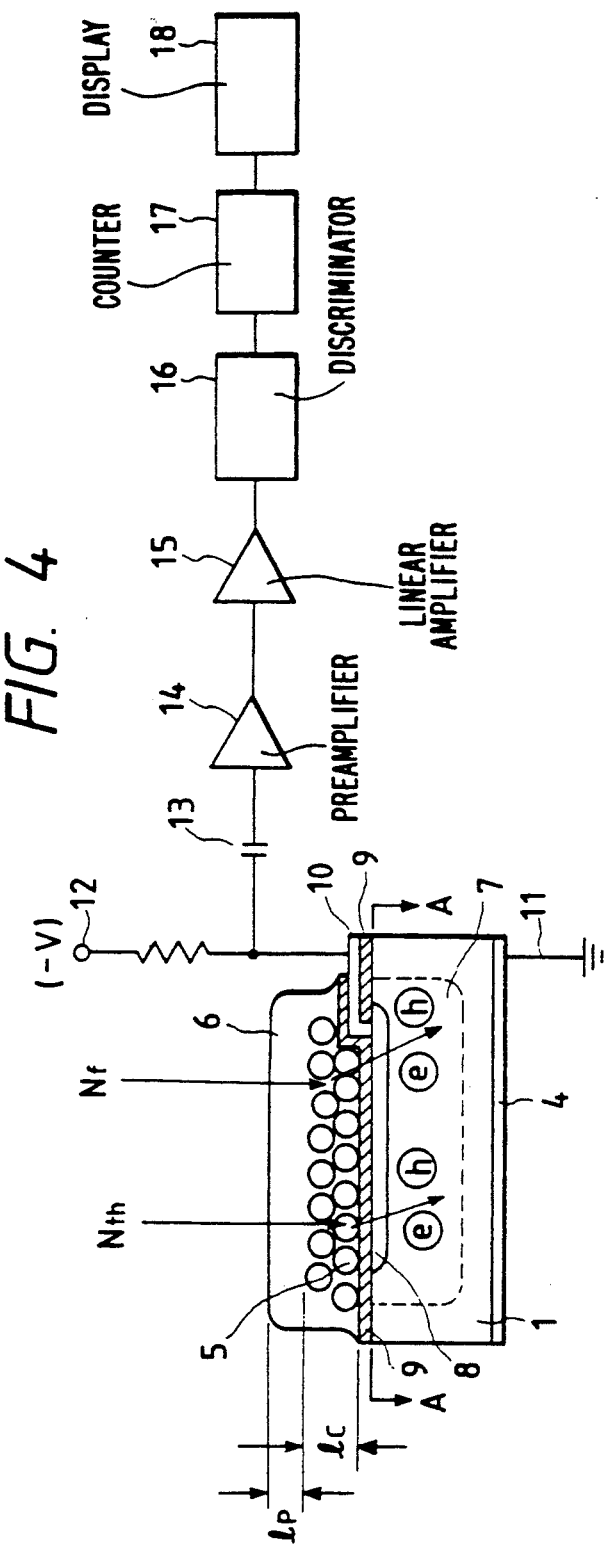
FIG. 4 shows a schematic diagram of a semiconductor neutron detector and a block diagram of a measurement circuit for the neutron individual dosimeter.
Figure 4:
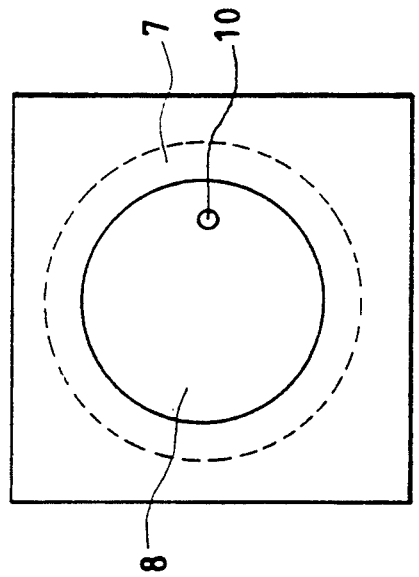

FIG. 4 shows the structure of a semiconductor detection element, and a block diagram of the measurement circuit for a personal neutron dosimeter. The structure of a semiconductor detection element 1 will be described by using n-type silicon as an example. At first, p-n junction (p-layer) 8 is formed in the surface of n-type silicon 1 through impurity (boron) diffusion. The surface of the junction 8 is then insulated and protected by a silicon oxide film ($SiO_2$). A pointed junction electrode 10 for loading out signals is provided as shown in the figure, and an earth electrode 11 provided in ohmic contact on the surface opposite the junction is led out. When a reverse bias voltage is applied between the electrodes 10 and 11, a depletion region 7 is effected to expand below the junction 8. On the surface of the semiconductor detection element 1 having the oxide film 9 interposed therebetween, a mass of grain (powder) shaped boron 5 is bonded tightly by calcination. The interstices between the grains are infiltrated by proton radiators (hydride compounds) and the outer surface thereof is further covered by the same 6. As preferable hydride compounds to be used, there are paraffin, epoxy, polyethylene or the like. The whole detection element is hermetically sealed in a can, though not shown, and lead wires from respective electrodes at p-layer 8 and n-layer 4 are drawn outside the can. The electrode 10 in contact with the p layer 8 is formed into a point in order to prevent attenuation of $\alpha$ rays and protons. The oxide film 9 which serves as an incident window for $\alpha$ rays and the like is readily formed into a thickness of approximately 100 Å. By providing layers of the abovementioned converters and proton radiators in the incident window, attenuation of charged particles in the electrode 10 and oxide film 9 is capable of being minimized. Further, it sometimes occurs that neutron moderator (not shown) is required to be used outside or inside the sealing can. Incident thermal neutrons(Nth) incoming from outside into a dosimeter of the present invention enter into a nuclear reaction in thermal neutron converter 5 to generate $\alpha$ rays. Likewise, fast neutrons (Nf) generate repulsion protons through scattering actions with proton radiators. These $\alpha$ rays and proton rays produce electric charges in the depletion region 7 in the detection element 1. Such electric charges produced in accordance with the incident thermal neutrons (Nth) and fast neutrons (Nf), after being guided through ac coupling capacitance 13, are amplified in a preamplifier 14 and a linear amplifier 15, respectively. Amplified signals undergo wave height discrimination in a discriminator 16, and their pulses are measured in a counter circuit 17. Based on the values counted in the counter circuit 17, quantities of dose are calculated and displayed in an arithmetic/display unit 18.

The principle of neutron detection according to the present invention is roughly classified into two categories as follows. One is that low energy thermal neutrons enter into a nuclear reaction in boron 5 as represented by equation 3, hence emitting $\alpha$ rays therefrom.

$$^{10}B(n,\alpha)^7Li \qquad (3)$$

where $\alpha$ rays have energy of 1.47 MeV, and produce charges of pairs of electrons e and holes h in the depletion region 7 in the detection element 1, which charges cause to vary the detector current. The other one is that incident fast neutrons interact (scatter) with proton radiators 6, generating repulsion protons, which in turn produce charges of pairs of electrons e and holes h in the depletion region 7, which cause to vary the detector current. The preferred embodiment of the invention described herewith is capable of providing an improved detection sensitivity and a wider range of energy detection through improving probabilities of occurrence of respective interactions according to the above two categories, and efficiencies of collecting introduced charged particles ($\alpha$ rays, protons). The details of their operations will be described below.

The number N (l) of nuclear reactions taking place in boron 5 which serves as a converter is expressed as follows.

$$N(l) = \phi \cdot n \cdot \sigma \cdot l \qquad (4)$$

where, $\phi$: the number of incident neutrons (n/cm$^2$.S)
n: atomic density of converter (1/cm$^3$)
$\sigma$: cross-section of nuclear reaction (barn)
l: thickness of converter (cm)

Figure 5:
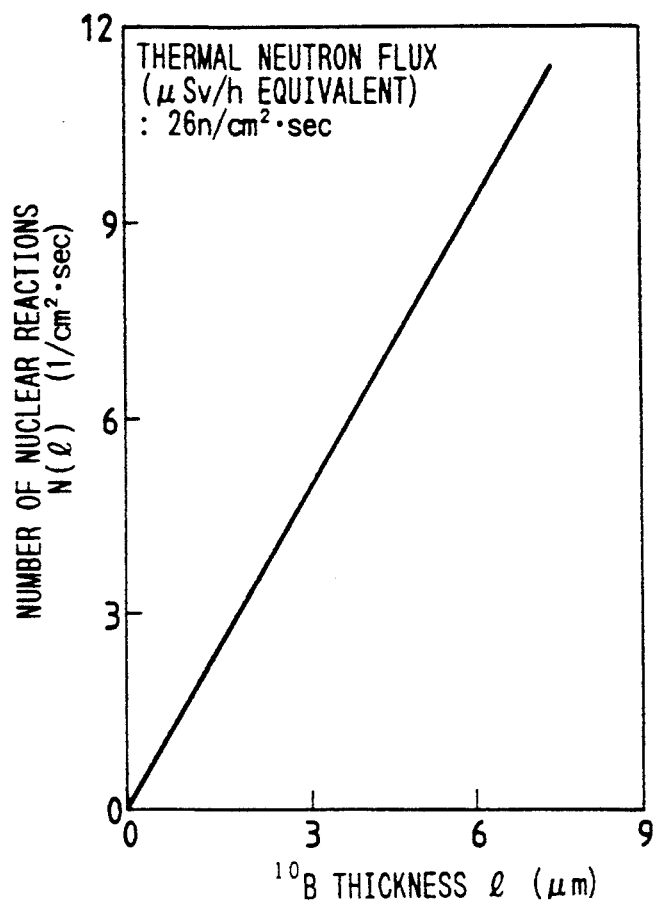
FIG. 5 shows a relationship between the number of nuclear reactions N(l) and the thickness of converters.

As is obvious from the equation, the number N(l) of nuclear reactions is directly proportional to the thickness l of the converter, which numeric relationship is shown in FIG. 5. On the other hand, the flight range in boron and silicon of $\alpha$ rays generated in the converters is up to 7 $\mu$m. Thereby, in such a structure wherein the thickness of boron converters is more than 7 $\mu$m, or when a flight range more than 7 $\mu$m is required in silicon, $\alpha$ rays will soon be attenuated, thus contributing none to the improvement in the sensitivity of the detector. Namely, the contribution of $\alpha$ rays saturates at 7 $\mu$m or more of the thickness of converters.

On the other hand, anoccurrence probability $\sigma p$ of protons to be generated by fast neutrons by scattering in the proton radiator 6 will be expressed by the following equation, wherein an incident energy of neutrons is given by En(MeV).

$$\sigma P = (En) \qquad \text{Eq. 5}$$
$$= 4.83/\sqrt{En} - 0.578 \text{(barn)}$$

Namely, the occurrence probability $\sigma p$ changes in proportion to the power of $-\frac{1}{2}$ of incident neutron energy En, which occurrence probability, however, does not depend on the scattering angle of protons. On the other hand, the energy of the protons hereinabove generated depends on scattering angles, thereby, an energy distribution for protons generated by monochrome neutrons involves a continuous distribution from 0 eV energy up to incident energy En. The range of the protons is approximately 1 mm at 10 MeV, but low energy protons are rapidly attenuated while passing through boron.

The preferred embodiment of the invention shown in FIG. 4, has been contemplated taking into account the abovementioned considerations. Thereby, a layer thickness lc composed of grain boron 5 easy to process having an average grain size of 10 $\mu$m is set at 30 $\mu$m with a porosity rate of 75%, which corresponds to a layer thickness of 7 $\mu$m consisting of 100% boron, so that a calcinated layer thickness as thick as possible to maximize the number N(l) of nuclear reactions without exceeding the range of $\alpha$ rays may be obtained. The interstices in grain boron 5 are infiltrated with proton radiator 6, and an entire outer surface is coated further with a layer of the proton radiator 6 to a thickness (1 p=) of 2 mm. By means of such detector construction, most of the low energy components of protons generated in the proton radiators 6 are permitted, without passing through boron, thereby without attenuation, to get into the detection element 1.

Further, α rays generated in the grain shaped boron 5 have energy of 1.47 MeV, thereby they are scarcely attenuated while passing through several μm of proton radiators composed of hydride compounds having a small atomic number. Further, on the side of the semiconductor detection element 1, the oxide film 9 and p-layer 8 being insensitive to charged particles, and only causing attenuation to α rays and the like, their thickness is controlled within 0.3 μm in order to prevent drop of sensitivity.

As hereinabove described, the present embodiment of the invention, has advantages as follows simply as a personal neutron dosimeter. Because of an increased effective thickness of boron enabled by being provided in grain form, detection sensitivity to thermal neutron is capable of being improved approximately by 10 times greater than the prior arts. Further, the shield effect of boron on fast neutrons, in particular, on the fast neutrons in lower energy side is capable of being reduced, thereby, detection sensitivity for fast neutrons is capable of being improved as a whole. Still further, with respect to the manufacturing techniques, there are no specific problems, and calcination (evaporation solidification) of grain boron is readily performed. Further, permeable coating using permeable hydride compounds is effective for preventing reduction in a boron layer by peel-off due to temperature changes. There may be conceivable some other methods other than the calcination method. For example, a composite layer comprising boron and proton radiators may be fixed to a semiconductor element with a plastic fixing film. Lastly, by means of a pointed electrode provided in the side of the charged particle converter such as boron and the like, a portion of the electrode which blocks the passage of charged particles into the semiconductor detection element is capable of being eliminated. In addition, the oxide film 9 is capable of being made thinner. Thereby, transmissivity of charged particles into the semiconductor detection element is capable of being substantially improved, thus increasing the detection sensitivity over a wider range of neutron energy.

Figure 6:
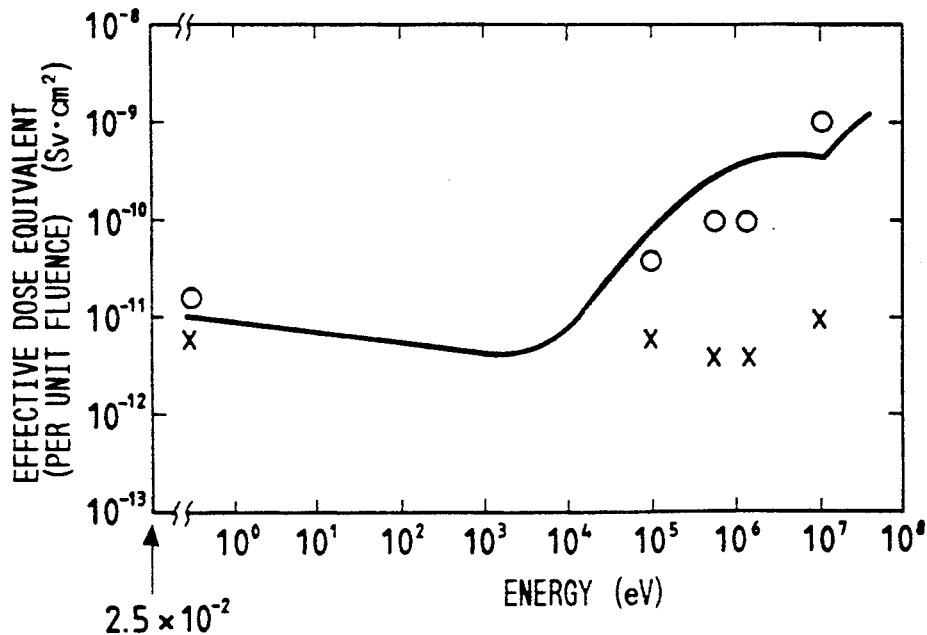
FIG. 6 shows the result of comparison of responses between the neutron individual dosimeter according to the present invention and the effective dose equivalent.

Next, a personal neutron dosimeter of another embodiment of the invention capable of evaluation of the effective dose equivalent conforming to the recommendation of the ICRP will be described. According to the today's radiation hazard prevention laws and regulations, it is required to have a neutron detector which has energy response characteristics capable of performing the effective dose equivalent evaluation conforming to the ICRP recommendations. The hereinabove embodiment detector also answers to such needs. Namely, with reference to FIG. 4, the detection sensitivity to fast neutrons is capable of being adjusted by changing the coating layer thickness lp of the proton radiator 6, the particle size of the grain boron 5, or a ratio of quantities between the proton radiator and the grain boron. A solid line curve in FIG. 6 shows a relationship between the neutron energy and the effective dose equivalent (which indicates degrees of influence upon human body) according to the ICRP recommendation. Circles o in the figure indicate characteristics of the embodiments of the present invention, while x marks indicate those of the prior art detectors. Data available in FIG. 6 are limited in the range of thermal neutron, and from several 100 KeV up to 15 MeV. Data between several 100 KeV and thermal neutrons are interpolated by Monte Carlo simulation. This is because that data in such intermediate region cannot be gathered experimentally by the present state-of-the-art technologies.

Figure 7:
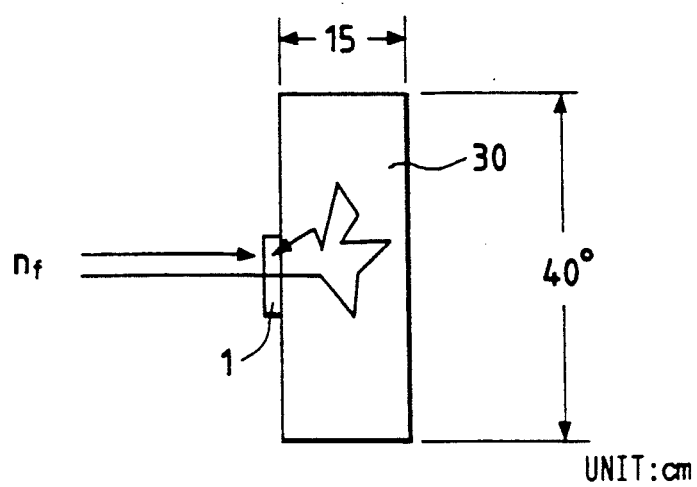
FIG. 7 illustrates a state at calibration of the personal dosimeter of the present invention.

As a personal neutron dosimeter is utilized being attached to the chest of human body as shown in FIG. 3, calibration tests for the personal neutron dosimeter must be performed taking into account neutrons scattered from within the body. Data in FIG. 6 is obtained by using a dosimeter fixed not on the chest of human body but at the center of a phantom simulating human body, made of acrylic or water, of a size of 40×40×15 cm. FIG. 7 shows the behavior of a neutron in a phantom simulating a human body. A part of fast neutrons interacts with proton radiators in the dosimeter, but most of them reaches a phantom 30 and are scattered therein. Some of the scattered beams enter a neutron detection element 1. It is natural that the energy of neutrons which enter the dosimeter includes, with the incident neutrons being the maximum, up to thermal neutrons. It is possible readily to obtain the response of the effective dose equivalent by adjusting the kinds of converters in the dosimeter, its grain size, layer thickness, and also the kinds of proton radiators and its layer thickness.

Energy response characteristics of the personal dosimeter of the hereinabove described preferred embodiment according to the present invention show a good agreement even in a higher energy region in comparison with the prior art examples. Further as they agree well with the response of the effective dose equivalent, it will be obviously appreciated that a practical neutron dosimeter for personal use is capable of being provided.

Further, with respect to the embodiment of FIG. 4, charged particles are generated through such a structure that grains of boron are calcinated, and their interstices and a surface thereon are plugged with proton radiators. Such structure, however, may be substituted for with a compound or mixture of boron and hydride compounds.

Figure 8:
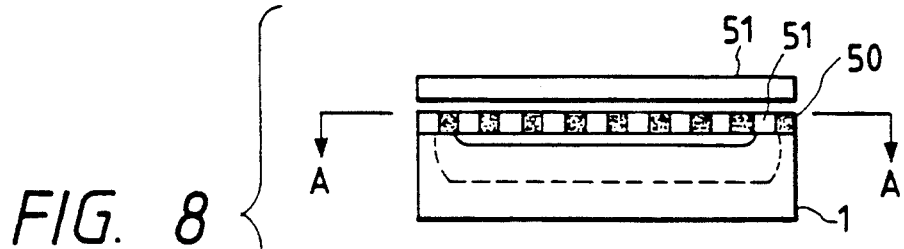
FIG. 8 shows a personal neutron dosimeter of a second embodiment of the invention.
Figure 8:
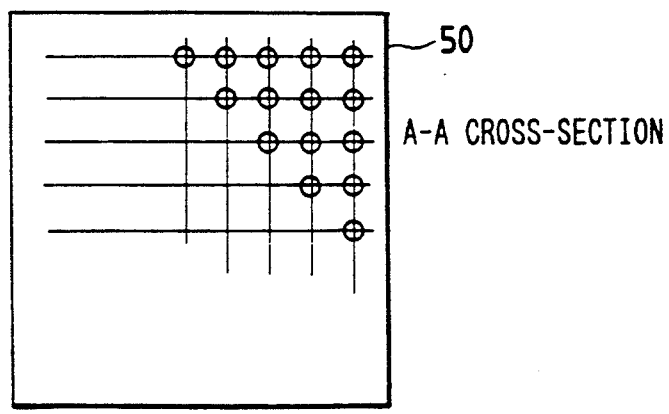

Another neutron detector of a second embodiment of the present invention will be described below with reference to FIG. 8. This embodiment has such a structure that a boron plate 50 having openings is provided in the surface of a semiconductor detection element 1, and the openings are plugged with proton radiators 51. According to this embodiment, it is possible to adjust the response of the detector by adjusting the area of openings (in case the opening is a circle, its diameter). A method of manufacturing boron plates having arbitrary shapes and openings may be implemented, first by forming a boron layer in front of a metal mask using sputtering techniques or the like, then removing the metal mask. The boron plate prepared as above is attached firmly on the surface of a semiconductor detection element 1. Attachment may be accomplished simply by bonding using adhesives or with mechanical fixture at peripheral portions.

Substantially the same advantages as in the first embodiment are capable of being attained according to this embodiment of the invention.

Figure 9:
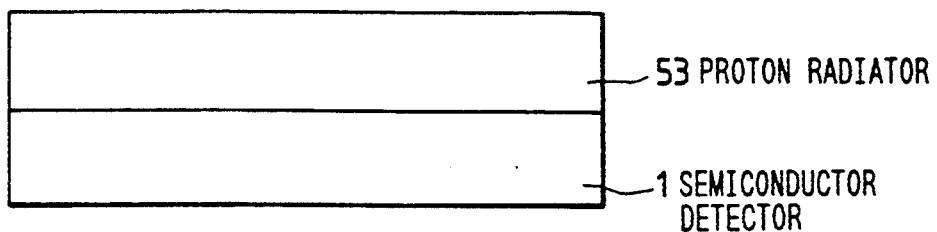
FIG. 9 shows a personal neutron dosimeter of a third embodiment of the invention.

Further, a third embodiment of the invention is shown in FIG. 9. This embodiment consists of a semiconductor detection element 1 and a proton radiator 53 formed thereon, thus providing a detector which is sensitive only to fast neutrons. The proton radiator 53 is capable of being provided simply by applying paraffin or the like as in the case of FIG. 4. According to this embodiment of the invention, it is capable of providing a personal neutron dosimeter which has an especially high detection sensitivity to fast neutrons.

Figure 10:
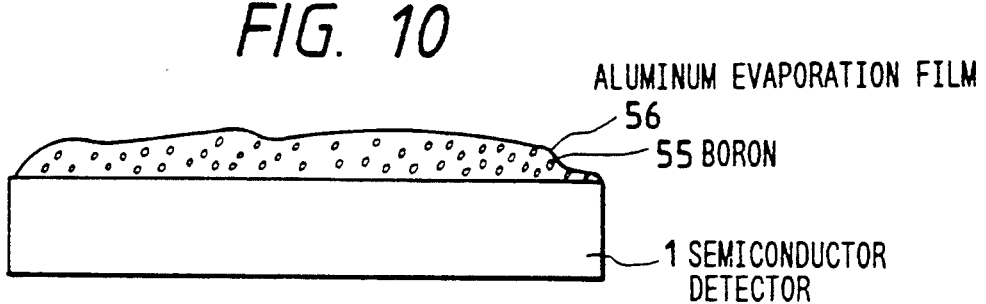
FIG. 10 shows a personal neutron dosimeter of a fourth embodiment of the invention.

A fourth embodiment of the invention is shown in FIG. 10. In this embodiment, a layer of grains of boron 55 is formed on the surface of a semiconductor detection element 1, an outer surface of which is coated by substance devoid of hydrogen such as aluminum evaporation film 56 for protection. This detector prepared as above is sensitive only to thermal neutrons, and a peel-off problem due to temperature changes is minimized through the employment of grains of boron with a maximized thickness permitted for the layer, thus substantially having improved detection sensitivity to thermal neutrons. According to this embodiment of the invention, it is possible to provide for a personal neutron dosimeter having an especially high detection sensitivity to thermal neutrons.

Boron is utilized as material for effecting nuclear reactions with thermal neutrons in each of the above embodiments of the invention. This, however, may be replaced by lithium effecting a nuclear reaction of $^6Li(n,\alpha)^3H$, or by uranium. In this case, however, since energy of $\alpha$ rays emitted therefrom differs from that of boron, it is necessary to determine the thickness of converters appropriately according to their flight ranges. Further, in the hereinabove description, as an exemplary sensitivity enhancing substance, there have been utilized proton radiators such as hydride compounds or the like, which, however, may be any other substance only if it generates heavy charged particles through interactions with fast neutrons. Further, silicon semiconductors utilized for semiconductor detection elements in the above description may be replaced by chemical compound semiconductors using cadmium telluride, mercury iodide or the like.

Figure 11:
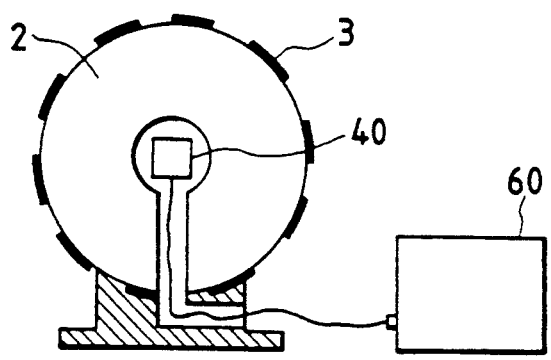
FIG. 11 shows a neutron dose rate meter of a first embodiment of the present invention.
Figure 12:
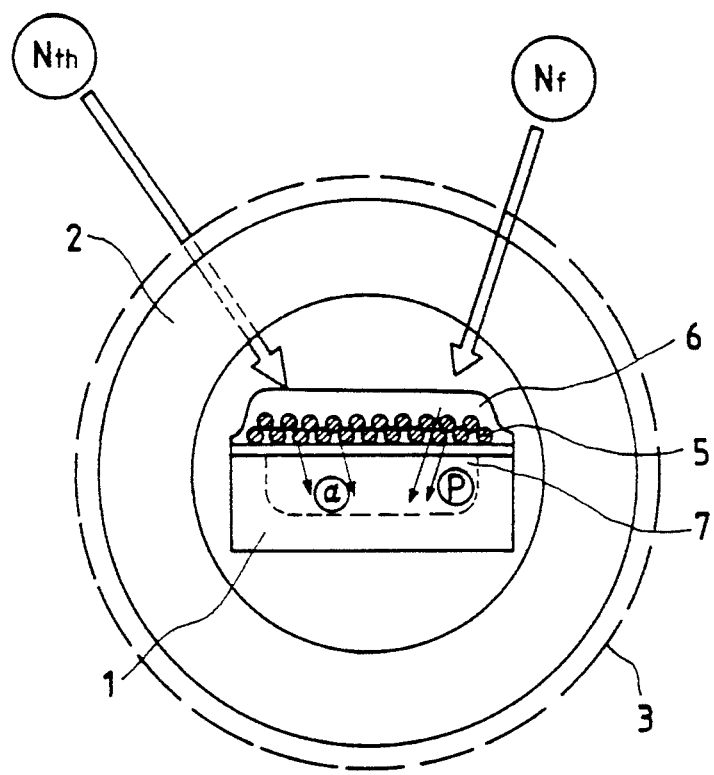
FIG. 12 is a schematic diagram illustrating a neutron detector portion of a first embodiment of the invention.

Next, we will describe neutron dose rate meters. FIG. 11 shows a semiconductor neutron dose rate meter of an embodiment of the invention. According to the present embodiment, a human body simulating phantom is composed of a spherical neutron moderator 2 and a thermal neutron absorber 3 which have openings, the latter disposed over the outer shell. Inside the phantom, the above semiconductor neutron detector 40 is installed. Neutron detection signals are transmitted outside to a radiation measurement circuit 60 via a signal cable. This type of system using the spherical neutron moderator 2 is capable of providing a preferable dose rate meter which retains a maximized nondirectivity. FIG. 12 illustrates a schematic diagram of a neutron detection portion according to the present invention. In this embodiment, a semiconductor detector as shown in FIG. 4 is installed at the center of a neutron moderator 2 made of paraffin or polyethylene, and a thermal neutron absorber 3 made of cadmium plate or the like having openings. In FIG. 12, a metal case (can) for hermetically sealing in a semiconductor detection element 1 and a signal cable for taking out signals are omitted. Incident thermal neutrons(Nth) entering the dose rate meter from outside are partially absorbed in the thermal neutron absorber 3 and neutron moderator 2, and a portion of which reaches the detection element 1. Here, they enter into a nuclear reaction with thermal neutron converters 5, producing $\alpha$ rays. Fast neutrons (Nf) without being absorbed in the thermal neutron absorber 3 reaches the neutron moderator 2, where some of them are decelerated to thermal neutrons, but some other reaches a proton radiator 2. In the proton radiator, repulsion protons are produced through scattering action with fast neutrons. Charges of these $\alpha$ rays and proton beams produced as above are collected in a depletion region 7 in the semiconductor detection element 1.

Figure 13:
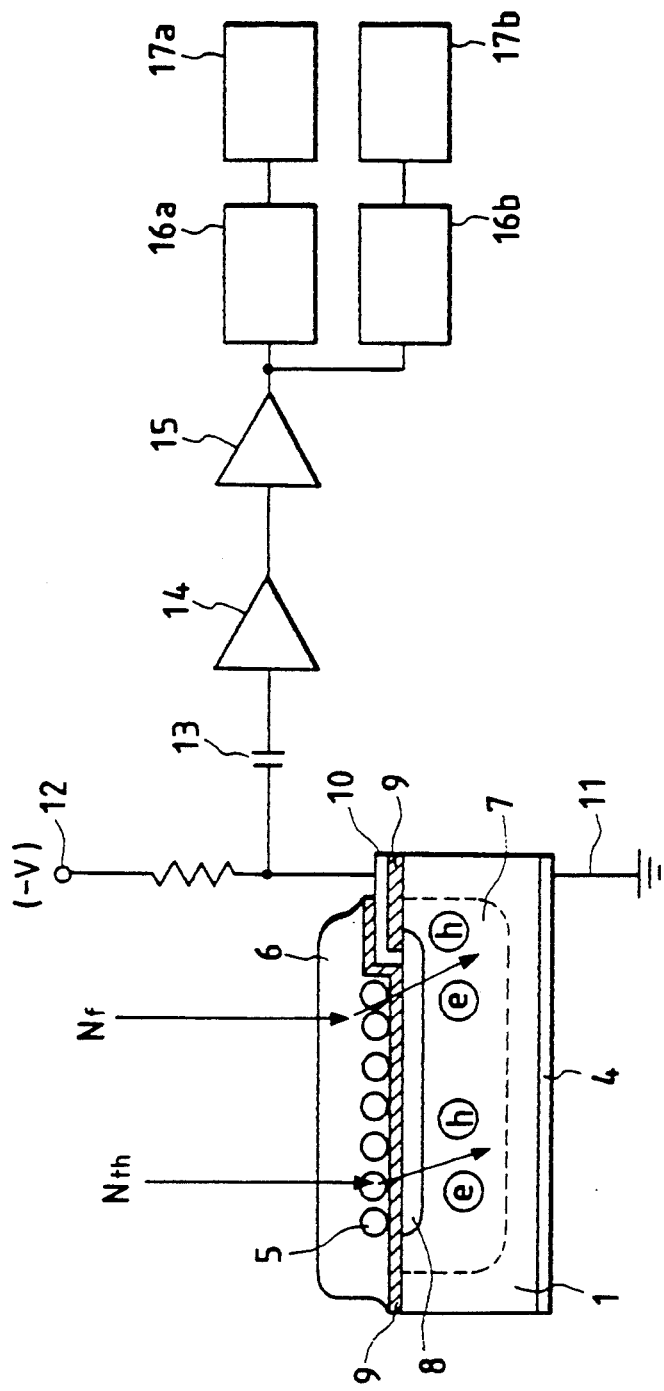
FIG. 13 shows a structure of a neutron detector and a block diagram of a radiation measurement circuit 60.

FIG. 13 shows a neutron detector structure and a block diagram of a radiation measuring circuit 60. For the structure of the neutron detector is the same as that of FIG. 4, explanation will be omitted. The radiation measuring circuit 60 is basically the same as that in FIG. 4, but has two types of discriminators 16 and counter circuits 17, respectively. Suffix a subsystem represents an energy dependent total counter, while suffix b subsystem indicates a circuit for discriminating fast neutrons having energies greater than a prescribed value to be described later.

Figure 14:
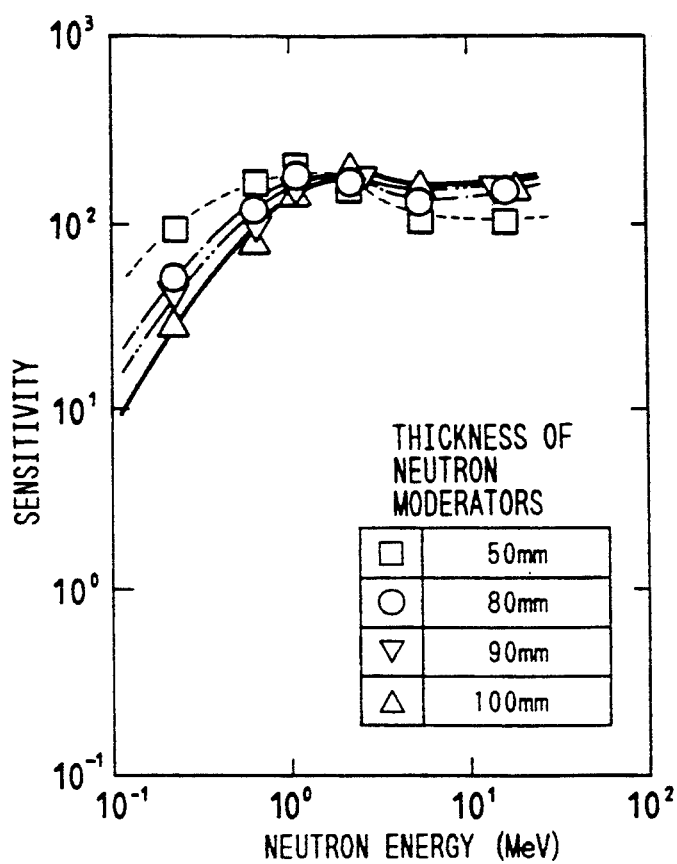
FIG. 14 shows energy responses of the neutron dosimeters according to the present invention, when the thickness of neutron moderators was varied.

FIG. 14 shows examples of measurements of energy responses by the neutron dose rate meter of the invention. This figure shows the results of measurements obtained by varying the thickness of the neutron moderator as a parameter. Main specifications of the structure of this neutron dose rate meter is as follows.

| | |
|---|---|
| grain size of boron | 20 μm |
| thickness of proton radiator | 2 mm |
| opening ratio for thermal neutron absorber | 70% (opening coefficient) (0.5 mm thick cadmium) |

As above, it is possible to change the response of the dose equivalent through changing the thickness of the neutron moderator.

Figure 15:
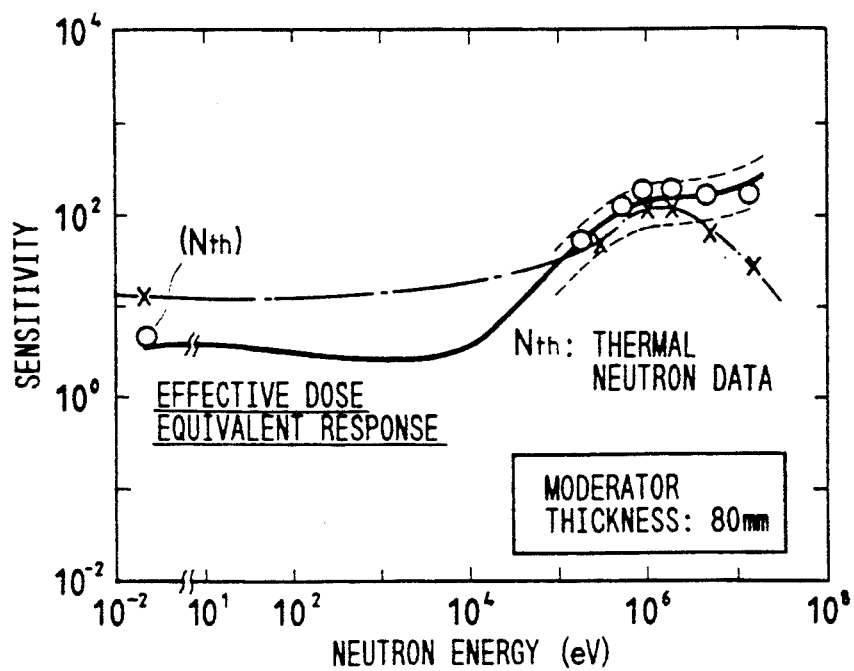
FIG. 15 shows the result of comparison of the responses between the neutron dosimeters of the present invention and the effective dose equivalent.

FIG. 15 shows the response of the neutron dose rate meter according to the present invention in comparison with the response of the effective dose equivalent. The thickness of the neutron moderator was 80 mm (the same data as for the moderator thickness of 80 mm in FIG. 14). The data was interpolated likewise that in FIG. 6. As obviously seen from the results of the comparison, the response of the neutron dose rate meter of the invention agrees well with the dose equivalent response at a high precision within ±30% over an energy range from thermal neutrons up to 15 MeV. Concurrently, some examples of the response of a prior art dose rate meter are shown. The prior art dose rate meter has shown that its sensitivity falls exceeding several MeV.

As hereinabove described, it is possible to implement the effective dose equivalent response through adjustment of the thickness of the neutron radiation moderator. Further, although the thickness of the neutron radiation moderator is adjusted in the above description, the same effect may be attained by adjusting the thickness of the thermal neutron absorber or its opening ratio. The neutron radiation dose rate meter according to the present invention is capable of being applied to an area monitor, environmental monitor, surveillance monitor and so on to be employed for radiation handling facilities such as nuclear power generation plants or the like, thus providing a novel and practical measuring device.

Figure 16:
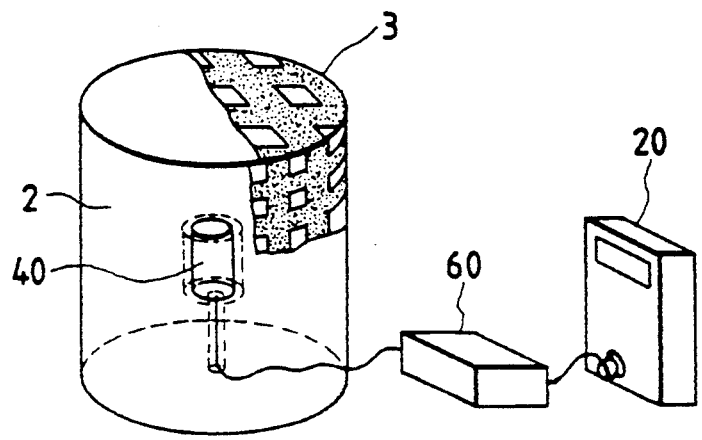
FIG. 16 shows a neutron dose rate meter of a second embodiment of the present invention.
Figure 17:
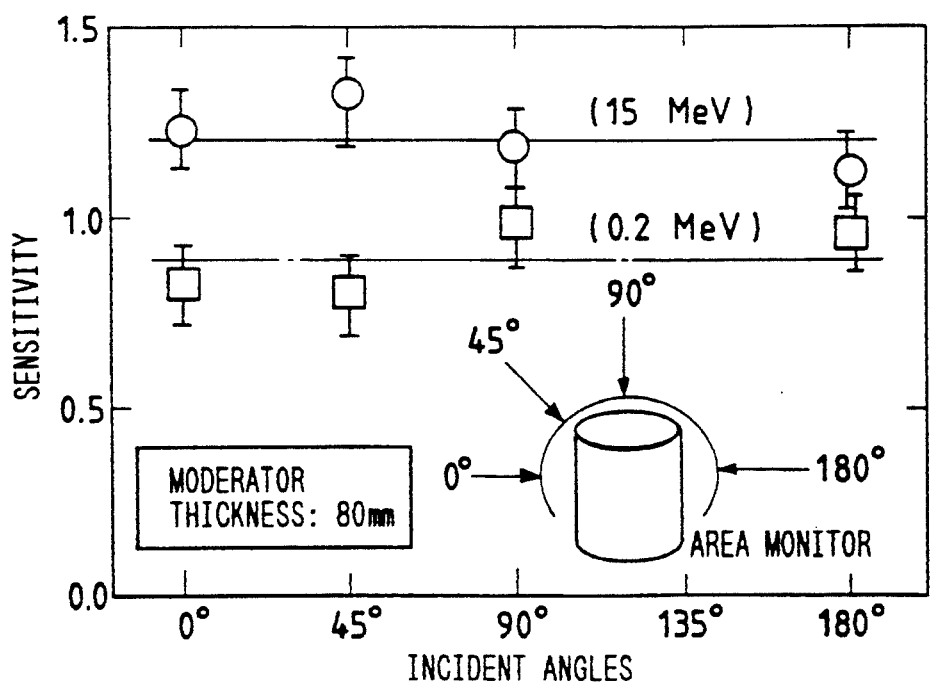
FIG. 17 shows directivity in a perpendicular direction for the neutron dose rate meter of the second embodiment of the invention.

Still another neutron radiation dose rate meter of a second embodiment of the invention is shown in FIG. 16. In order to retain nondirectivity, a neutron radiation moderator of a nearly spherical body, more specifically, a right circular cylinder body having the same length for the diameter and the height, is utilized. A semiconductor neutron detector 40 is placed in the center of the neutron radiation moderator 2, over the outer surface of which thermal neutron absorbers 3 having openings are attached. Neutron detection signals are transmitted, via a signal cable, to a measurement circuitry 60 and an indicator unit 20 which includes a data processing unit. A neutron radiation moderator 2 having an outer form of a sphere is expensive to manufacture. However, a substantial cost reduction in production cost will be attained by forming the neutron moderator 2 into a right circular cylinder substantially resembling a sphere. There arises a possibility to give rise to directivity by rendering the neutron radiation moderator 2 anything but a sphere form. FIG. 17 shows the result of the investigation on the directivity obtained in a perpendicular direction and other incident angles with respect to this embodiment. As is obvious from this result, the directivity is capable of being ignored within an allowance of ±10%. This is because of the effect of a repeated scattering of the neutrons within the moderator so as to permit the directivity to be lessened substantially.

Figure 18:
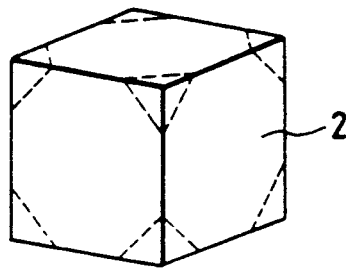
FIG. 18 shows a neutron dose rate meter of another embodiment of the invention.
Figure 19:
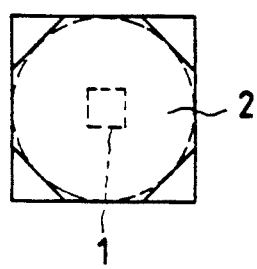
FIG. 19 is a cross-sectional view of the embodiment of FIG. 18.
Figure 20:
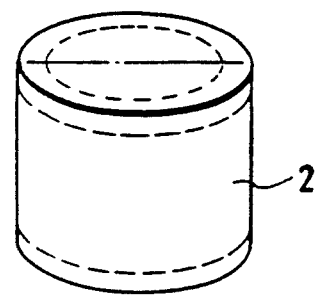
FIG. 20 shows a neutron dose rate meter of still another embodiment of the invention.

According to the above verification, another modified embodiment of the present invention is capable of being contemplated as follows. FIG. 18 illustrates a neutron moderator 2 of the invention shaped into a square cube, every corner of which is cut out. FIG. 19 shows a raised plan view of FIG. 18. A neutron detector 40 is disposed in the center in each of these embodiments described herewith. FIG. 20 is still another modification of the neutron moderator 2 of the invention formed into a right circular cylinder the corner of which to be cut away likewise. Each of these modified embodiments is capable of fully retaining the performance and advantages of the present invention. In FIGS. 18, 19 and 20, illustrations of a thermal neutron absorber 3 are omitted.

Figure 21:
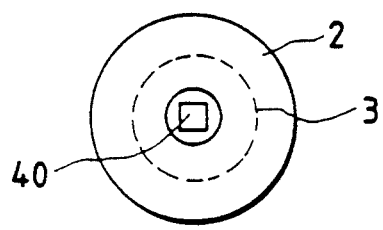
FIG. 21 shows a neutron dose rate meter of furthermore embodiment of the invention wherein a thermal neutron absorber is included inside a neutron moderator.
Figure 22:
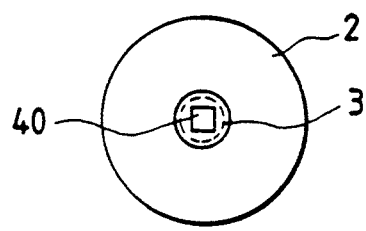
FIG. 22 shows a neutron dose rate meter of still further embodiment of the invention wherein a thermal neutron absorber is disposed in a space inside a neutron moderator.

FIG. 21 shows a thermal neutron absorber 3 disposed in another modified version of the invention. In FIG. 21, the thermal neutron absorber 3 having openings is installed inside a neutron moderator 2. FIG. 22 shows another thermal neutron absorber 3 disposed in still another modified version of the invention, wherein a thermal neutron absorber 3 having openings is disposed in an interstice between a neutron moderator 2 and a neutron detector 40. When the thermal neutron absorber 3 is disposed deeper inside the neutron moderator 2, the quantity of the thermal neutron absorber 3 is capable of being reduced.

Figure 23:
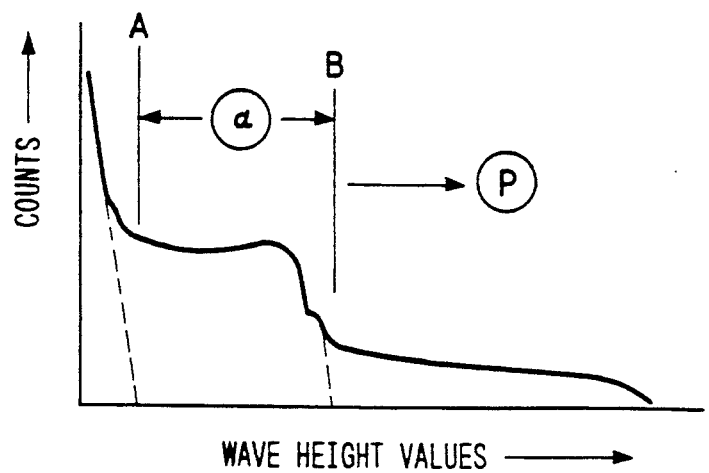
FIG. 23 illustrates an exemplary distribution of wave heights of signals measured according to the present invention.

FIG. 23 shows an example of the wave height distribution (spectrum) of signals measured according to the present invention. α region between the wave height values A and B represents a wave height region for α rays generated by the nuclear reactions with thermal neutrons. The region exceeding wave height value B represents a wave height region for protons generated through interactions with fast neutrons having several MeV. A region below wave height B indicates wave height values for gamma rays. By dividing discrimination levels into A, B, or into multilevels beyond B, it is capable of readily performing concurrent discriminations of respective energy components for fast neutrons from each output signal (see the block diagram of the measuring circuitry in FIG. 13). Of course, energy of neutrons, calibration coefficients for wave height values and sensitivity coefficients for effecting neutron detection in respective wave height regions should be obtained in advance, and their data conversion processing into absolute values are necessary. Because there are great needs for simultaneous discrimination measurement of fast neutrons, in particular, in such facilities where high energy accelerators are utilized, applicability of the present invention will be extremely wide and extensive.

Further, with respect to the thermal neutron absorber, boron or lithium is capable of being substituted for cadmium. In the above embodiments, although the detection sensitivity to thermal neutron components is adjusted by changing the opening ratio in the neutron absorber, it is, however, possible to effect the sensitivity adjustment by changing the thickness of the thermal neutron absorber.

Still further, although the semiconductor detection elements are utilized as detection elements in the above embodiments as in the case of the personal dosimeter, chemical compound semiconductors such as cadmium telluride or mercury iodide may be utilized instead.

A neutron dose rate meter is capable of being provided which is capable of implementing the effective dose equivalent response, through installing a neutron detector capable of implementing the effective dose response on a certain volume of water, acrylic or the like serving as a phantom simulating a human body, which has been described in the personal dosimeter using neutron moderators and thermal neutron absorbers.

In the hereinabove case, the neutron detectors are limited to such that are capable of attaining the effective dose equivalent response. The dose equivalent response, however, is capable of being changed by varying the thickness of the neutron moderators or thermal neutron absorbers as well. Hence, although a neutron detector cannot realize the effective dose equivalent response by itself, it is still possible to implement the effective dose equivalent response as a whole of a neutron dose rate meter by changing the thickness or the like of the neutron moderator or thermal neutron absorber which surround the same neutron detector. In this case, from a view point of providing a neutron dose rate meter capable of implementing the effective dose equivalent response, the neutron detector may be a $BF_3$ counter or $^3He$ counter.

Lastly, in the hereinabove descriptions, the neutron moderators and thermal neutron absorbers are disposed in enclosure. In such a case, however, when a neutron dose rate meter is disposed along a wall, because an incident direction of neutron radiations is limited, the neutron moderator or thermal neutron absorber may be installed only in such a specific incident direction.

INDUSTRIAL APPLICABILITY

As hereinabove described, according to the present invention, it is capable of providing a personal neutron dosimeter which implements the dose equivalent response.

It is further capable of providing a personal neutron dosimeter utilizing a single wafer of semiconductor detection element which is capable of implementing the dose equivalent response.

Still further, it is capable of providing a personal neutron dosimeter which has an especially high sensitivity to thermal neutron radiations.

Furthermore, it is capable of providing a personal neutron dosimeter which has an especially high sensitivity to fast neutron radiations.

Lastly, it is capable of providing a neutron dose rate meter which is capable of implementing the dose equivalent response.

What is claimed is:

1. A neutron individual dose meter comprising: a neutron detector comprising a plurality of grains of a first material which generates charged particles through a nuclear reaction with thermal neutrons, and a second material different from the first material, both provided in a mixture state bonded to the surface of a semiconductor detection element; a processing circuitry for processing signals obtained from said neutron detector; and a power source for supplying power to said neutron detector and the processing circuitry.

2. The neutron individual dose meter claimed in claim 1, wherein said first material is characterized by being boron.

3. A neutron individual dose meter claimed in claim 1, wherein said second material is a hydride compound, and said first material is bonded by calcination on the surface of the semiconductor element.

4. A neutron individual dose meter comprising: a neutron detector comprising a grain-formed material which generates charged particles through a nuclear reaction with thermal neutrons and another material which generates no charged particles through interactions with fast neutrons, both formed on the surface of a semiconductor detection element; a processing circuitry for processing signals from said neutron detector; and a power source for supplying power to said neutron detector and processing circuitry.

5. The neutron individual dose meter claimed in claim 4 wherein, said grain-formed material characterized by being boron.

6. A meter according to claim 4, wherein said another material has a thermal expansion coefficient approximately equal to that of said semiconductor detection element or an elasticity which absorbs a thermal expansion of said grain-formed material, both said grain-formed material and said another material are bonded by calcination to a surface of said semiconductor detection element.

7. A neutron dose rate meter comprising: a neutron detector having a plurality of grains of a first material which generates charged particles in a semiconductor radiation detection element through a nuclear reaction with thermal neutrons and a second material different from the first material, both provided in a mixture state in the surface of the semiconductor detector element; a thermal neutron absorber disposed in the direction of incidence of said neutrons with respect to said neutron detector; a processing circuitry for processing signals from said neutron detector; and a power source for supplying power to said neutron detector and processing circuitry.

8. A neutron dose rate meter comprising: a neutron detector having a plurality of grains of a first material which generates charged particles in a semiconductor radiation detection element through a nuclear reaction with thermal neutrons and a second material different from the first material, both provided in a mixture state on the semiconductor radiation detection element; a thermal neutron absorber disposed so as to surround said neutron detector; a processing circuitry for processing signals from said neutron detector; and a power source for supplying power to said neutron detector and processing circuitry.

9. The neutron dose rate meter of claim 8 wherein, said thermal neutron absorber is characterized by having openings.

10. A neutron dose rate meter claimed in claim 8, further comprising a neutron moderator, said neutron moderator and said thermal neutron absorber both being disposed so as to surround said neutron detector.

11. A method of fabricating a neutron detector characterized by comprising steps of: bonding by calcination grain-formed boron which generates charged particles through a nuclear reaction with thermal neutrons on the surface of a semiconductor detection element; and infiltrating a hydride compound into the interstices of the bonded grain-formed boron to be retained firmly therein.

12. A neutron individual dose meter, comprising:
a neutron detector having a layer made up of grain-formed material which generates charged particles through a nuclear reaction with thermal neutrons and another material which generates charged particles through an interaction with fast neutrons, said another material being infiltrated into interstices in the grains of said grain-formed material, the layer being formed on a surface of a semiconductor detection element;
a processing circuitry for processing signals from said neutron detector; and
a power source for supplying power to said neutron detector and processing circuitry.

13. A neutron individual dose meter claimed in claim 12, wherein said grain-formed material is boron.

14. A neutron individual dose meter claimed in claim 12, wherein said another material is a hydride compound, and said grain-formed material is bonded by calcination on the surface of the semiconductor detection element.

15. A neutron individual dose meter claimed in claim 12, wherein a neutron sensitivity of said dose meter is adjusted to a desired dose equivalent response by varying an amount of said grain-formed material and said another material in said layer.

16. A neutron individual dose meter claimed in claim 12, wherein a grain thickness is varied so as to improve a detection sensitivity to thermal neutron.

17. A neutron individual dose meter, comprising:
a neutron detector having a layer made up of a first material which generates charged particles through a nuclear reaction with thermal neutrons and a second material which generates charged particles through an interaction with fast neutrons, said first material being provided in a substantially plate form having openings therein, said second material being provided in said openings, the layer being formed on a surface of a semiconductor detection element;
a processing circuitry for processing signals from said neutron detector; and
a power source for supplying power to said neutron detector and processing circuitry.

18. A neutron individual dose meter claimed in claim 17, wherein a neutron sensitivity of said dose meter is adjusted to a desired dose equivalent response by varying areas of the openings of said second material.

19. A neutron dose rate meter, comprising:
a neutron detector having a layer made up of a grain-formed material which generates charged particles through a nuclear reaction with thermal neutrons and another material which generates charged particles through an interaction with fast neutrons, said another material being infiltrated into interstices in the grains of said grain-formed material, said layer formed on a surface of a semiconductor detection element;

a neutron moderator provided either on or above said neutron detector in the direction of incidence of said neutrons;

a processing circuitry for processing signals from said neutron detector; and a power source for supplying power to said neutron detector and processing circuitry.

20. A neutron dose rate meter, comprising:

a neutron detector having a layer made up of a grain-formed material which generates charged particles through a nuclear reaction with thermal neutrons and another material which generates charged particles through an interaction with fast neutrons, said another material being infiltrated into interstices in the grains of said grain-formed material, said layer being formed on a surface of a semiconductor detection element;

a neutron moderator disposed so as to surround said neutron detector;

a processing circuitry for processing signals from said neutron detector; and a power source for supplying power to said neutron detector and processing circuitry.

21. A neutron dose rate meter as claimed in claim 20, wherein said grain-formed material is boron, and said another material is a hydride compound.

22. A neutron dose rate meter, comprising:

a neutron detector having a plurality of grains of a first material which generates charged particles in a semiconductor detection element through a nuclear reaction with thermal neutrons and a second material different from said first material, both provided in a mixture state on said semiconductor detection element;

a human body simulating phantom firmly attached to said neutron detector;

a processing circuitry for processing signals from said neutron detector; and a power source for supplying power to said neutron detector and said processing circuitry.

23. A neutron dose rate meter as claimed in claim 22, wherein said phantom is constituted of acrylic having a surface area of 40 cm×40 cm and a height of 15 cm, or a vessel of the same size containing water, and said neutron detector being fixed firmly on a surface of said phantom.

24. A neutron detector comprising a layer made up of a grain-formed material which generates charged particles through a nuclear reaction with thermal neutrons and another material which generates charged particles through an interaction with fast neutrons, said another material being infiltrated into interstices in the grains of said grain-formed material, the layer being formed on a surface of a semiconductor detection element.

25. A neutron detector comprising a layer made up of a first material which generates charged particles through a nuclear reaction with thermal neutrons and a second material which generates charged particles through an interaction with fast neutrons, said first material being provided in a substantially plate form having openings therein, said second material being provided in said openings, the layer being formed on a surface of a semiconductor detection element.

26. A neutron individual dose meter, comprising:

a neutron detector having a semiconductor detection element made up of a single wafer of semiconductor, electrodes formed on obverse and reverse sides of said wafer, at least one electrode on a p-n junction side of said electrodes being formed so as to cover a portion of a depletion region therein, said at least one of said electrodes having a reduced area so that an amount of charged particles entering said semiconductor element is increased, a power source for applying voltage to said electrodes;

a processing circuitry for processing signals from said neutron detector; and a power source for supplying power to said neutron detector and said processing circuitry.

27. A neutron detector, comprising:

a single wafer of semiconductor;

electrodes provided on obverse and reverse surfaces of said wafer;

a semiconductor detection element, in which at least one of said electrodes on a p-n junction side of said electrodes is formed so as to cover a portion of a depletion region therein, said at least one of said electrodes having a reduced area so that an amount of charged particles entering said semiconductor element is increased; and a power source for applying voltage to said electrodes.

28. A neutron individual dose meter, comprising:

a neutron detector having a semiconductor detection element made up of a single wafer of semiconductor, electrodes formed on obverse and reverse sides of said wafer, a p-n junction formed inside the obverse side of said semiconductor element, at least one of said electrodes being connected to said p-n junction with a small area compared with that of said p-n junction and being formed so as to cover a portion of a depletion region therein, a power source for applying voltage to said electrodes;

a processing circuitry for processing signals from said neutron detector; and a power source for supplying power to said neutron detector and processing circuitry.

29. A neutron detector, comprising:

a single wafer of semiconductor;

electrodes provided on obverse and reverse surfaces of said wafer;

a semiconductor detection element, in which a p-n junction is formed inside the obverse side of said semiconductor element, at least one of said electrodes being connected to said p-n junction with a small area compared with that of said p-n junction and being formed so as to cover a portion of a depletion region therein; and a power source for applying voltage to said electrodes.

* * * * *